No. 853,307. PATENTED MAY 14, 1907.
G. B. KINSLER.
SHAFT COUPLING.
APPLICATION FILED DEC. 6, 1906.
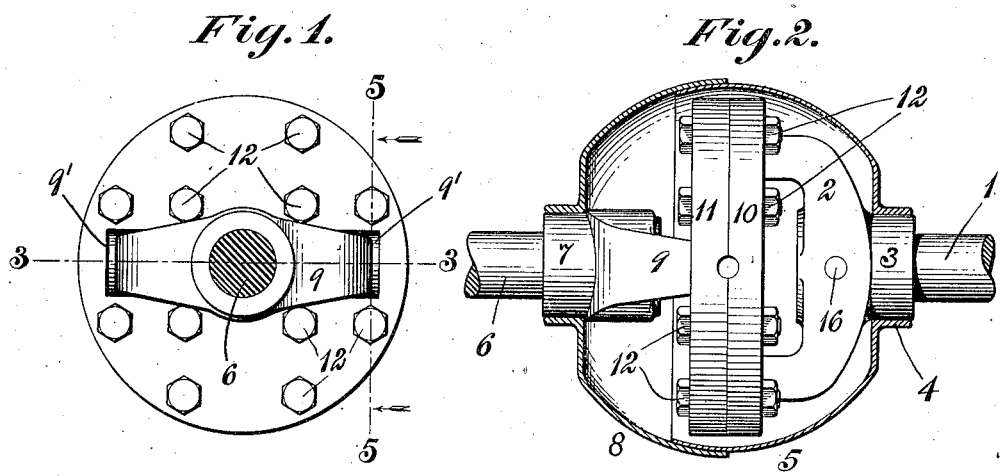
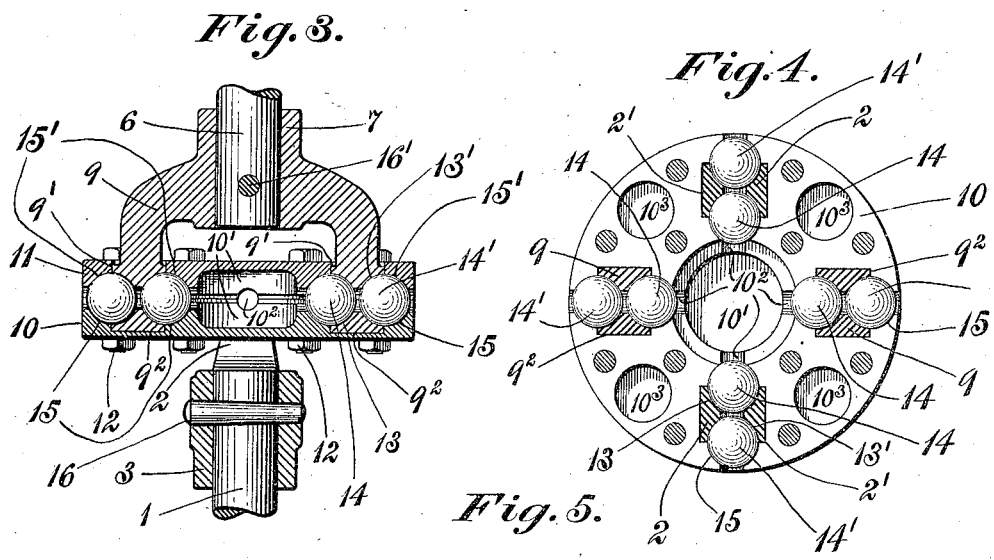
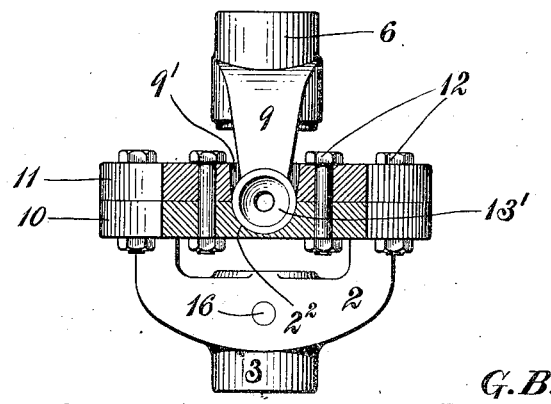
Witnesses:
H. E. Anderson
F. E. Blodgett
Inventor:
G. B. Kinsler
By his Attorney,

UNITED STATES PATENT OFFICE.

GEORGE B. KINSLER, OF HARTFORD, CONNECTICUT, ASSIGNOR OF ONE-HALF TO JOSEPH A. BENNETT, OF HARTFORD, CONNECTICUT.

SHAFT-COUPLING.

No. 853,307.  Specification of Letters Patent.  Patented May 14, 1907.

Application filed December 6, 1906. Serial No. 346,523.

*To all whom it may concern:*

Be it known that I, GEORGE B. KINSLER, a citizen of the United States, residing at Hartford, in the county of Hartford and State of Connecticut, have invented certain new and useful Improvements in Shaft-Couplings, of which the following is a specification.

This invention relates to shaft-couplings, and has for its object the provision of improved devices for connecting separated shafts and for obtaining a universal movement between the two.

Another object of the invention is the provision of antifriction-balls or rollers located between separable plates which connect the forks of two shafts, and whereby friction is reduced and ease of movement attained, as will be hereinafter set forth.

Other objects of the invention will be stated in the following detailed description.

In the accompanying drawings, Figure 1 is a side elevation partially in section of the improved universal coupling or joint. Fig. 2 is an edge view in elevation, showing in section a two-part dust or dirt excluding casing which may be employed to protect the parts. Fig. 3 is a sectional view taken on line 3—3 of Fig. 1. Fig. 4 is a transverse sectional view. And Fig. 5 is a sectional view taken on line 5—5 of Fig. 1 looking in the direction of the arrow.

Like numerals designate similar parts throughout the several views.

Referring to the drawings, the numeral 1 indicates a shaft to which is secured, or made integral therewith, a fork 2, said shaft having a collar 3 upon which the hub 4 of one section of a dust or dirt-excluding casing, designated in a general way by 5, is mounted. Opposite the shaft 1, or located at an angle thereto, as may be required, is a shaft 6 having a collar 7 upon which the other section 8 of said casing 5 is secured in the same manner. This shaft is also provided with a fork 9, as will be hereinafter explained.

Designated by 10 and 11, are plates for connecting the forks 2 and 9, said plates being provided with slots 2' and 9' and recesses $9^2$ and $2^2$, respectively, for the reception of the extremities of said forks. Circular recesses $10'$ in the center of plates 10 and 11 form a cavity when said plates are secured together by bolts and nuts 12 which serves as a reservoir for lubricant conducted therefrom through openings $10^2$. To reduce the weight of plates 10 and 11 stock is removed as at $10^3$ (see Fig. 4). In the ends of the arms of each fork 2 and 9 are oppositely-disposed, curved recesses 13, 13' for the reception of balls 14, 14' and in the plates 10—11 are sockets 15—15' for the reception of said balls, so that when the parts are united a comparatively frictionless rocking movement is assured.

Preferably the hubs of the forks are secured to the shafts by pins 16—16', although as stated said forks may be made integral with the shafts without departure from the invention.

In assembling the parts of the improved joint the balls are put in place, and the plates are united by means of the bolts 12, as illustrated in Figs. 3 and 5, after which the shafts may be inclined toward each other, or one section may be moved with relation to the other in the ordinary manner of universal joints with ease and without injurious wear, all foreign matter being excluded from the joint by the sectional casing described.

As will be obvious the ball-sockets in the forks and plates may be hardened if desired, or may be composed of inserted steel plates.

Changes may be made in the various details of the construction without departure from the invention, which is not limited to the exact details described.

Having thus described my invention, what I claim is—

1. A universal coupling comprising a pair of shafts, each having a fork provided with ball-recesses in its arms, plates in which said forks are inserted, each plate having ball-recesses, balls and means for uniting said plates.

2. The combination, with a pair of shafts, each having a fork at its end, and each fork provided with opposing ball-recesses, of balls fitting the recesses of the forks; and plates having ball-recesses.

3. The combination, with a pair of forked shafts, each fork having ball-recesses in its arms, of plates slotted to receive the arms of the forks; means for uniting said plates; and balls located in the recesses of the arms and plates.

4. The combination, with a pair of forked shafts, each fork having ball recesses in its arms, of plates slotted to receive the arms of the forks; means for uniting said plates; balls located in the recesses of the arms and plates; and a sectional casing surrounding the forks and plates.

In testimony whereof I affix my signature in presence of two witnesses.

GEORGE B. KINSLER.

Witnesses:
F. E. ANDERSON,
F. E. BLODGETT.